(12) United States Patent
Bickham et al.

(10) Patent No.: US 8,538,218 B2
(45) Date of Patent: Sep. 17, 2013

(54) UNREPEATERED LONG HAUL OPTICAL FIBER TRANSMISSION SYSTEMS

(75) Inventors: Scott Robertson Bickham, Corning, NY (US); John David Downie, Painted Post, NY (US); Jason Edward Hurley, Corning, NY (US); Andrey Kobyakov, Painted Post, NY (US); Sergey Yurevich Ten, Horseheads, NY (US); Xianming Zhu, Corning, NY (US)

(73) Assignee: Corning Incorporated, Corning, NY (US)

( * ) Notice: Subject to any disclaimer, the term of this patent is extended or adjusted under 35 U.S.C. 154(b) by 158 days.

(21) Appl. No.: 13/030,479

(22) Filed: Feb. 18, 2011

(65) Prior Publication Data

US 2011/0222863 A1 Sep. 15, 2011

Related U.S. Application Data

(60) Provisional application No. 61/312,420, filed on Mar. 10, 2010.

(51) Int. Cl.
*G02B 6/02* (2006.01)

(52) U.S. Cl.
USPC .......................................................... 385/123

(58) Field of Classification Search
USPC .......................................................... 385/123
See application file for complete search history.

(56) References Cited

U.S. PATENT DOCUMENTS

| 6,157,754 | A  | * | 12/2000 | Sasaoka et al. | 385/24 |
| 6,317,238 | B1 | * | 11/2001 | Bergano et al. | 398/81 |
| 6,556,758 | B2 | * | 4/2003  | Kato | 385/127 |
| 6,618,191 | B2 | * | 9/2003  | Grochocinski et al. | 359/334 |
| 6,684,017 | B1 | * | 1/2004  | Tsukitani et al. | 385/123 |
| 7,016,583 | B2 | * | 3/2006  | Downie et al. | 385/123 |
| 7,076,139 | B1 | * | 7/2006  | Aikawa et al. | 385/123 |
| 7,558,480 | B2 | * | 7/2009  | Bickham | 398/37 |
| 7,689,085 | B1 |   | 3/2010  | Mishra | |

(Continued)

FOREIGN PATENT DOCUMENTS

WO 2003088531 A1 10/2003

OTHER PUBLICATIONS

Miyakawa, T., et al, "40 Gbits/s-based unrepeatered WDM transmission systems," Optical Fiber Communications Conference, Post Conference Technical Digest, IEEE Cat. No. 02CH37339) Opt Soc. America Washington, DC, USA, vol. TOPS. vol. 70, Mar. 17, 2002, pp. 606-608.*

*Primary Examiner* — Charlie Peng
(74) *Attorney, Agent, or Firm* — Robert L. Carlson

(57) ABSTRACT

A long haul optical fiber transmission system includes a transmitter having a modulated bit rate of at least 40 Gb/s. A receiver is optically coupled to the transmitter with a composite optical fiber span. The optical fiber includes a first optical fiber coupled to the transmitter and a second optical fiber coupled to the first optical fiber. The first optical fiber has an effective area of at least 120 $\mu m^2$, an attenuation of less than 0.180 dB/km, and a length $L_1$ from about 30 km to about 90 km. The second optical fiber has an effective area of less than 120 $\mu m^2$, an attenuation of less than 0.180 dB/km, and a length $L_2$. The sum of $L_1$ and $L_2$ is at least 160 km. The composite optical fiber span does not include a repeater along the length of the span between the transmitter and the receiver or any rare earth dopants.

19 Claims, 6 Drawing Sheets

(56) References Cited

U.S. PATENT DOCUMENTS 8,126,338 B2 * 2/2012 Wree et al. ............... 398/208
2004/0213581 A1 * 10/2004 Okuno ...................... 398/183
2006/0147167 A1 * 7/2006 Charlet et al. ............ 385/123
2012/0301093 A1 * 11/2012 Sillard et al. .............. 385/126

* cited by examiner

UNREPEATERED LONG HAUL OPTICAL FIBER TRANSMISSION SYSTEMS

CROSS-REFERENCE TO RELATED APPLICATIONS

This application claims the benefit of priority under 35 U.S.C. §119(e) of U.S. Provisional Application Ser. No. 61/312,420 filed on Mar. 10, 2010.

BACKGROUND

1. Field

The present specification generally relates to optical fiber transmission systems and, more specifically, to unrepeatered long haul optical fiber transmission systems utilizing effective area managed, low attenuation composite optical fiber spans.

2. Technical Background

Submarine optical fiber cable systems (i.e., those which travel under water) typically extend between continents, islands, and/or along coastlines and facilitate the high speed transmission of data signals between two points. Such systems are often repeatered meaning that the submarine systems utilize one or more repeaters along the length of the optical fiber system to boost the signal strength to account for attenuation in the optical fibers. A repeater is a unit typically in the form of an enclosed, hermetically sealed box which contains an amplifier to boost signal strength and an equalizer to correct for distortions in the signal. Typically such repeaters are placed at intervals along the submarine cable to allow longer cables to be used. However, these repeaters are expensive and require electrical power usually delivered through an undersea cable thus increasing the complexity of the optical fiber system.

Accordingly, a need exists for alternative optical fiber transmission systems capable of delivering a data signal over long spans without the use of repeaters.

SUMMARY

According to one embodiment, a long haul optical fiber transmission system includes a transmitter comprising a modulated bit rate of at least 40 Gb/s. A receiver is optically coupled to the transmitter with a composite optical fiber span which includes a first optical fiber and a second optical fiber. The first optical fiber is optically coupled to the transmitter and has an effective area $Aeff_1$ of at least 120 $\mu m^2$, an attenuation $\alpha_1$ of less than 0.180 dB/km, a nonlinear refractive index $n_2^1$, and a length $L_1$ from about 30 km to about 90 km. The second optical fiber is optically coupled to the first optical fiber and has an effective area $Aeff_2$ of less than 120 $\mu m^2$, an attenuation $\alpha_2$ of less than 0.180 dB/km, a nonlinear refractive index $n_2^2$ and a length $L_2$. The sum of the length $L_1$ and the length $L_2$ is at least 160 km. The composite optical fiber span does not comprise a repeater between the transmitter and the receiver. The composite optical fiber span does not contain any rare earth dopants.

Additional features and advantages of the invention will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
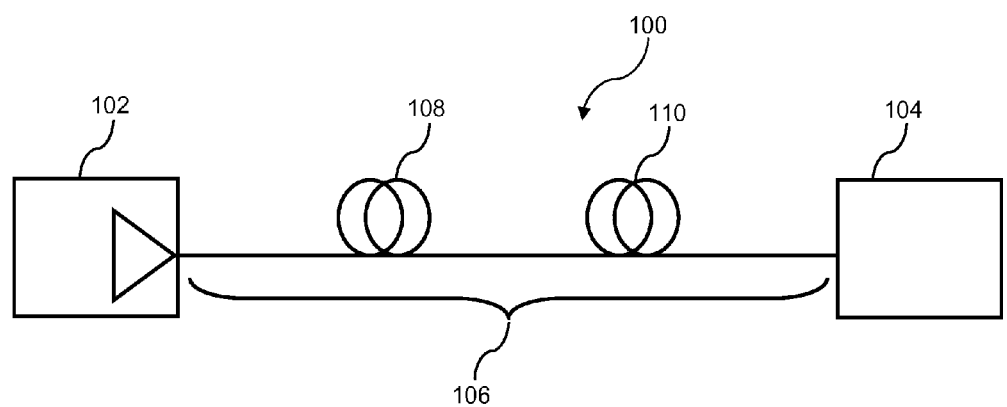
FIG. 1 schematically depicts a long haul optical fiber transmission system according to one or more embodiments shown and described herein.

Reference will now be made in detail to embodiments of long haul optical fiber transmission systems, examples of which are illustrated in the accompanying drawings. Whenever possible, the same reference numerals will be used throughout the drawings to refer to the same or like parts. One embodiment of a long haul optical fiber transmission system is depicted in FIG. 1. The long haul optical fiber transmission system generally comprises a transmitter optically coupled to a receiver with a composite optical fiber span comprising a first optical fiber optically coupled to a second optical fiber. The first optical fiber has a nonlinear phase shift of less than 0.46 and an effective area which is greater than the effective are of the second optical fiber. The long haul optical fiber transmission system does not include a repeater along the length of the composite optical fiber span between the transmitter and the receiver. The composite optical fiber span does not contain any rare earth dopants including, without limitation, erbium. Long haul optical fiber transmission systems and the various components of such systems will now be described in further detail herein with specific reference to the figures.

As used herein, the effective area of an optical fiber is the area of the area of the optical fiber in which light is propagated and is defined as:

$$A_{\textit{eff}} = 2\pi \frac{\left(\int_0^\infty E^2 r\, dr\right)^2}{\int_0^\infty E^4 r\, dr},$$

where E is the transverse electric field amplitude associated with light propagated in the fiber and r is the radius of the fiber.

Referring now to FIG. 1, one embodiment of a long haul optical fiber transmission system 100 is schematically depicted. The long haul optical fiber transmission system 100 comprises a transmitter 102 optically coupled to a receiver 104 with a composite optical fiber span 106. The transmitter 102 produces an optical output signal with a modulated bit rate of 40 Gb/s. In one embodiment (not shown) the transmitter 102 may comprise a Raman amplifier and/or an erbium doped fiber amplifier (EDFA) optically coupled to the composite optical fiber span 106.

In the embodiment shown in FIG. 1 the composite optical fiber span includes a first optical fiber 108 and a second optical fiber 110. The first optical fiber is optically coupled to the transmitter 102 while the second optical fiber 110 is optically coupled to the first optical fiber 108. The first optical fiber 108 has an effective area $Aeff_1$, a nonlinear refractive index $n_2^1$, an attenuation $\alpha_1$ and a length $L_1$. In the embodiments described herein, the effective area $Aeff_1$ of the first optical fiber is preferably greater than 120 µm², more preferably greater than 125 µm² and even more preferably greater than 130 µm², and most preferably, 135 µm² or greater. The attenuation $\alpha_1$ of the first optical fiber 108 is preferably less than 0.180 dB/km and, more preferably, less than 0.175 dB/km. The nonlinear refractive index $n_2^1$, of the first optical fiber is preferably less than or equal to $2.2 \times 10^{-20}$ m²/W. In the embodiments described herein the length $L_1$ of the first optical fiber is from about 30 km to about 90 km.

The first optical fiber has a nonlinear phase shift which is defined as:

$$\frac{4.343 n_2^1}{Aeff_1 \alpha_1}[1 - \exp(-a_1 L_1 / 4.343)].$$

In the embodiments described herein the nonlinear phase shift of the first optical fiber is preferably less than 0.46, more preferably less than 0.43, and, most preferably, less than 0.40. Accordingly, it should be understood that the first optical fiber may be selected such that the effective area $Aeff_1$, attenuation $\alpha_1$, nonlinear refractive index $n_2^1$, and length $L_1$ of the fiber yield a nonlinear phase shift of less than 0.46.

In one embodiment, the first optical fiber may be an optical fiber as described in U.S. patent application Ser. No. 12/362,694 entitled "Large Effective Area Fiber With Ge-Free Core" filed Jan. 30, 2009, (now issued as U.S. Pat. No. 7,689,085) the entirety of which is herein incorporated by reference. Such an optical fiber may have a compound core comprising an inner core region, an annular core region surrounding and directly adjacent to the central core region, and a fluorine doped second annular region surrounding and directly adjacent to the first annular core region. The compound core may be surrounded by a cladding. The dimensions and specific relative refractive indices of the compound core and cladding are disclosed in the aforementioned patent application. The dimensions and composition of the optical fiber may be selected such that the first optical fiber 108 has an effective area of at least 120 µm² as described above.

Still referring to FIG. 1, the second optical fiber 110 has an effective area $Aeff_2$, a nonlinear refractive index $n_2^2$, an attenuation $\alpha_2$ and a length $L_2$. In the embodiments described herein, the effective area $Aeff_2$ of the second optical fiber is less than the effective area $Aeff_1$ of the first optical fiber. In one embodiment, the effective area $Aeff_2$ of the second optical fiber is preferably less than 120 µm². In another embodiment, the effective area $Aeff_2$ of the second optical fiber is preferably less than 120 µm² and greater than 100 µm². The attenuation $\alpha_2$ of the second optical fiber 110 is preferably less than 0.180 dB/km and, more preferably, less than 0.175 dB/km. The nonlinear refractive index $n_2^2$ of the optical fiber is preferably less than or equal to $2.2 \times 10^{-20}$ m²/W. In the embodiments of the long haul optical fiber transmission system shown and described herein the length $L_2$ of the second optical fiber is selected such that the sum of the length $L_1$ of the first optical fiber and the length $L_2$ of the second optical fiber is at least 160 km. Accordingly, it should be understood that the length $L_2$ of the first optical fiber is at least 70 km.

In one embodiment, the second optical fiber is formed from Vascade® EX1000 optical fiber manufactured by Corning, Inc. The EX1000 optical fiber has an effective area between 70 to 85 µm², for example about 78 µm². Accordingly, it should be understood that, in this embodiment, the second optical fiber an effective area $Aeff_2$ of about 78 µm².

In an alternative embodiment, the second optical fiber 110 may comprise an optical fiber as described in U.S. patent application Ser. No. 12/362,694 entitled "Large Effective Area Fiber With Ge-Free Core" filed Jan. 30, 2009 (now issued as U.S. Pat. No. 7,689,085). Such an optical fiber may have a compound core comprising an inner core region, an annular core region surrounding and directly adjacent to the central core region, and a fluorine doped second annular region surrounding and directly adjacent to the first annular core region, as described above. The compound core may be surrounded by a cladding. The specific dimensions and relative refractive indices of the compound core and cladding are disclosed in the aforementioned patent application. The dimensions and composition of the optical fiber may be selected such that the second optical fiber 110 has an effective area of less than 120 µm².

As shown in FIG. 1, the composite optical fiber span comprises at least two low attenuation optical fibers with different effective areas. This type of composite optical fiber span may be referred to as an effective area managed optical fiber span and is utilized to reduce the nonlinearity of optical signals propagated through the optical fiber span. Alternative embodiments of composite optical fiber spans will now be described in more detail with reference to FIGS. 2 and 3.

Figure 2:
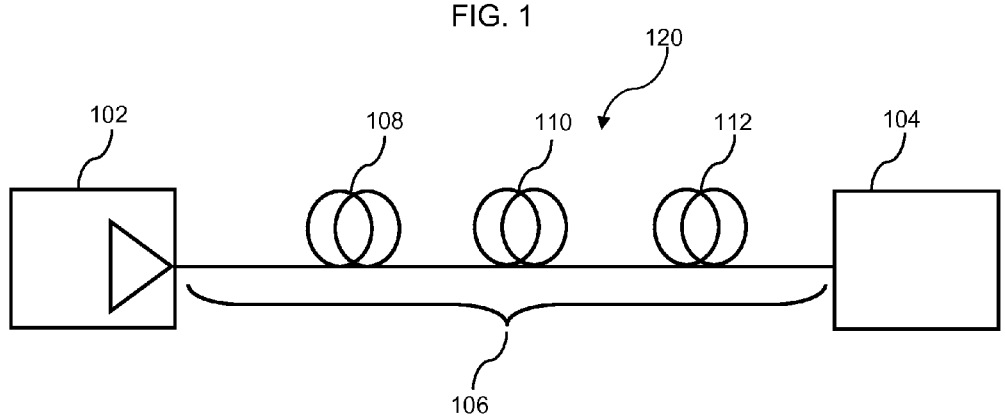
FIG. 2 schematically depicts a long haul optical fiber transmission system according to one or more embodiments shown and described herein.

Referring now to FIG. 2, a second embodiment of a long haul optical fiber transmission system 120 is schematically depicted. In this embodiment the long haul optical fiber transmission system 120 comprises a transmitter 102 optically coupled to a receiver 104 with a composite optical fiber span 106, as described above. However, in this embodiment, the composite optical fiber span 106 further comprises a third optical fiber 112 optically coupled to the second optical fiber 110 and the receiver 104. The third optical fiber 112 has an effective area $Aeff_3$, a nonlinear refractive index $n_2^3$, an attenuation $\alpha_3$ and a length $L_3$. In one embodiment, the effective area $Aeff_3$ of the third optical fiber is preferably less than 120 µm² and, more preferably, less than 100 µm². The attenuation $\alpha_3$ of the third optical fiber 112 is preferably less than 0.180 dB/km and, more preferably, less than 0.175 dB/km. The nonlinear refractive index $n_2^3$ of the optical fiber is preferably less than or equal to $2.2 \times 10^{-20}$ m²/W. The length $L_3$ of the third optical fiber 112 is from about 1 m to about 240 km. In one embodiment, the length $L_3$ of the third optical fiber is selected such that the sum of the length $L_1$ of the first optical fiber 108, the length $L_2$ of the second optical fiber 110 and the length $L_3$ of the third optical fiber 112 is preferably greater than 300 km, more preferably greater than about 350 km and, most preferably, about 400 km or less.

In one embodiment, the effective area $Aeff_3$ of the third optical fiber 112 is less than the effective area $Aeff_2$ of the second optical fiber 110. In this embodiment the third optical fiber 112 may be formed from Vascade® EX1000 optical fiber manufactured by Corning, Inc. The EX1000 optical fiber has an effective area between 70 to 85 µm², for example about 78 µm². Accordingly, it should be understood that, in this embodiment, the third optical fiber has an effective area $Aeff_3$ of 78 µm². In this embodiment, the second optical fiber 110 is formed from an optical fiber with an effective area greater than 78 µm², preferably greater than 85 µm².

In another embodiment, the effective area $Aeff_3$ of the third optical fiber 112 is greater than the effective area $Aeff_2$ of the second optical fiber 110. In this embodiment the second optical fiber 110 may be formed from Vascade® EX1000 optical fiber such that the second optical fiber 110 has an effective area $Aeff_2$ between 70 to 85 µm², for example about 78 µm² while the third optical fiber 112 is formed from an optical fiber with an effective area greater than 78 µm² preferably greater than 85 µm².

In the embodiment of the long haul optical fiber transmission system 100 depicted in FIG. 2, the receiver 104 may further comprise a Raman amplifier (not shown) and/or an erbium doped fiber amplifier (not shown) which may be used to reverse pump the composite optical fiber span 106 thereby amplifying and improving the quality of the optical signal received by the receiver 104.

Figure 3:
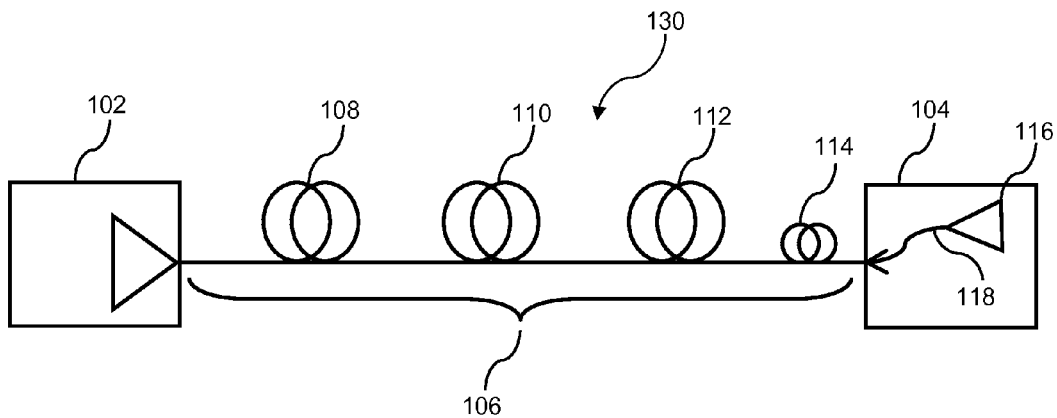
FIG. 3 schematically depicts a long haul optical fiber transmission system according to one or more embodiments shown and described herein.

Referring now to FIG. 3, another embodiment of a long haul optical fiber transmission system 130 is schematically depicted. In this embodiment the long haul optical fiber transmission system 130 comprises a transmitter 102 optically coupled to a receiver with a composite optical fiber span 106, as described above with respect to FIG. 2. However, in this embodiment, the composite optical fiber span 106 further comprises a fourth optical fiber 114 which is optically coupled to the third optical fiber 112 and the receiver 104. In addition, the receiver 104 also comprises a Raman amplifier 116 which may be used to reverse pump the composite optical fiber span 106 thereby amplifying and improving the quality of the optical signal transmitted through the composite optical fiber span 106. The Raman amplifier may use a single pump wavelength or multiple pump wavelengths. In the embodiments described herein, the Raman amplifier utilizes three pump wavelengths. In this embodiment, the receiver 104 also comprises an erbium doped fiber amplifier 118 optically coupled to the Raman amplifier 116 and the fourth optical fiber 114. As with the Raman amplifier 116, the erbium doped fiber amplifier is utilized to amplify and improve the quality of the optical signal transmitted through the composite optical fiber span 106. The fourth optical fiber 114 is utilized to facilitate coupling the Raman amplifier 116 and/or the erbium doped fiber amplifier into the composite optical fiber span 106 thereby extending the effective range of the amplification. More specifically, it has been found that use of the fourth optical fiber 114 maximizes the overall optical signal to noise ratio of the system while minimizing the nonlinear penalties in the composite optical fiber span 106. Further, it has also been found that use of the fourth optical fiber 114 reduces the amount of double Rayleigh back scattering in the composite optical fiber span and, as a result, reduces the amount of noise in the propagated optical signal thus improving the optical signal to noise ratio of the system.

In the embodiments described herein, the fourth optical fiber 114 has an effective area $Aeff_4$, a nonlinear refractive index $n_2^4$, an attenuation $\alpha_4$ and a length $L_4$. In one embodiment, the effective area $Aeff_4$ of the fourth optical fiber 114 is preferably less than 120 µm² and greater than the effective area $Aeff_3$ of the third optical fiber 112. The attenuation $\alpha_4$ of the fourth optical fiber 114 is preferably less than 0.180 dB/km and, more preferably, less than 0.175 dB/km. The nonlinear refractive index $n_2^4$ of the fourth optical fiber 114 is preferably less than or equal to $2.2 \times 10^{-20}$ m²/W. The length $L_4$ of the fourth optical fiber 114 is preferably less than the lengths of any of the first optical fiber 108, the second optical fiber 110 or the third optical fiber 112. In one embodiment, the length $L_4$ of the fourth optical fiber is from about 1 km to about 25 km, more preferably from about 10 km to about 20 km.

Figure 4:
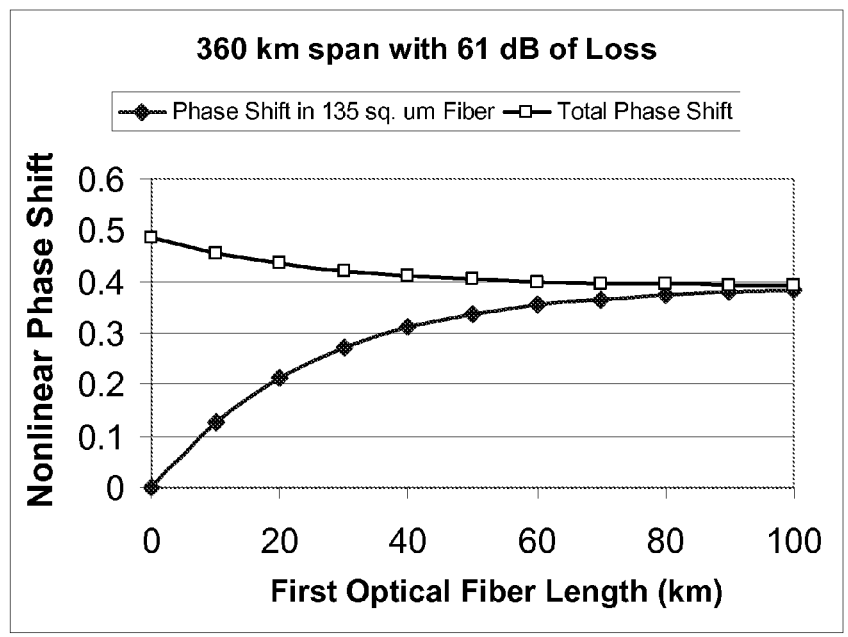
FIG. 4 graphically depicts the non-linear phase shift of the optical fiber transmission system of FIG. 2 wherein the first optical fiber has an effective area of 135 $\mu m^2$, the second optical fiber has an effective area of 110 $\mu m^2$ and the third optical fiber has an effective area of 78 $\mu m^2$.

While the embodiment of the long haul optical fiber transmission system 130 of FIG. 4 is depicted with both a Raman amplifier 116 and an erbium doped fiber amplifier 118, it should be understood that, in other embodiments, the system may comprise either a Raman amplifier 116 or an erbium doped fiber amplifier 118 to facilitate reverse pumping of the composite optical fiber span. Further, while the system of FIG. 4 has been described as containing an erbium doped fiber amplifier 118, it should be understood that the composite optical fiber span 106 does not contain any rare earth dopants including, without limitation, erbium.

It should be understood that, in each of the embodiments depicted in FIGS. 1-3, the composite optical fiber span may be formed from positive dispersion optical fibers. Accordingly, it should be understood that any one of the first optical fiber, the second optical fiber, the third optical fiber, or the fourth optical fiber may be a positive dispersion optical fiber having the desired physical and optical properties set forth herein.

Figure 5:
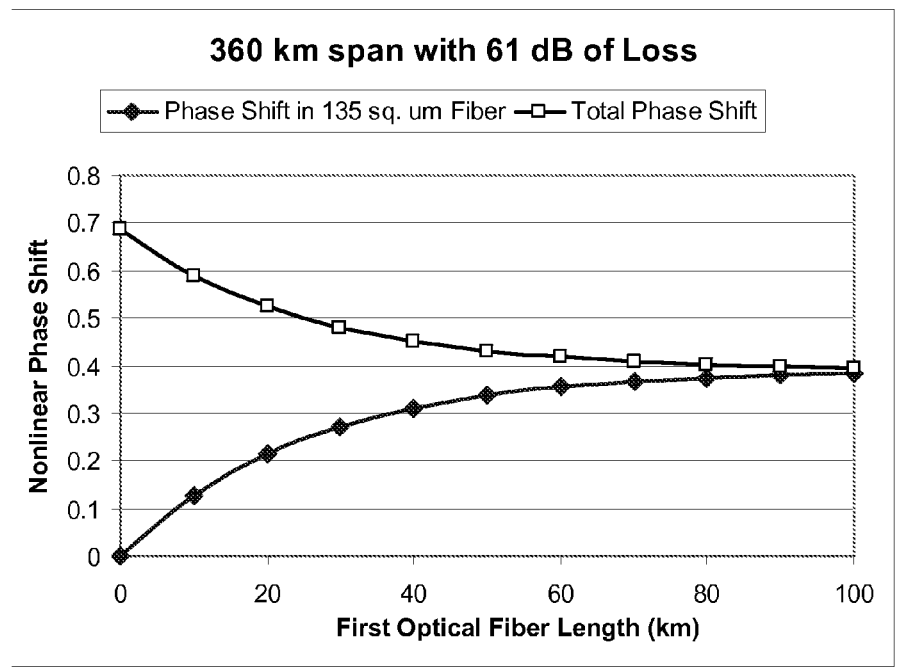
FIG. 5 graphically depicts the non-linear phase shift of the optical fiber transmission system of FIG. 1 wherein the first optical fiber has an effective area of 135 $\mu m^2$ and the second optical fiber has an effective area of 78 $\mu m^2$.

Referring now to FIGS. 4 and 5, long haul optical fiber transmission systems utilizing effective area managed composite optical fiber spans as described herein have reduced nonlinear phase shifts due to the use of large effective area optical fibers as the first optical fiber in the span. FIG. 4 graphically depicts the nonlinear phase shift of a modeled 360 km composite optical fiber span as a function of the length of the first optical fiber in the span. The data in FIG. 4 was based on a modeled composite optical fiber span having a first optical fiber with an effective area $Aeff_1$ of 135 µm², a second optical fiber having an effective area $Aeff_2$ of 110 µm², and a third optical fiber having an effective area of 78 µm². Each of the optical fibers in the modeled span had an attenuation of 0.17 db/km. The loss of the composite optical fiber span was held constant at 61 dB as the length of the first optical fiber was varied from 0 km to 100 km. The nonlinear phase shift was calculated at the junction between the first optical fiber and the second optical fiber and at the end of the third optical fiber.

FIG. 4 graphically depicts that the nonlinearity of the modeled system reaches a point of diminishing returns where the first optical fiber has a length of 30 km which corresponds to a system nonlinearity value of approximately 0.42. Further, FIG. 4 also shows that the optimum length of the first optical fiber is in the range from about 30 km to about 90 km which generally corresponds to a nonlinearity range from about 0.42 to about 0.40.

By way of contrast, FIG. 5 graphically depicts the nonlinear phase shift of a different modeled 360 km composite optical fiber span as a function of the length of the first optical fiber in the span. More specifically, the data in FIG. 5 is based on a modeled composite optical fiber span having a first optical fiber with an effective area $Aeff_1$ of 135 $\mu m^2$, and a second optical fiber having an effective area $Aeff_2$ of 78 $\mu m^2$. The modeled span did not contain a third optical fiber. Each of the optical fibers in the modeled span had an attenuation of 0.17 db/km. As described above, the loss of the composite optical fiber span was held constant at 61 dB as the length of the first optical fiber was varied from 0 km to 100 km. The nonlinear phase shift was calculated at the junction between the first optical fiber and the second optical fiber and at the end of the second optical fiber.

FIG. 5 graphically depicts that a significantly longer length of the first optical fiber is required to reduce the nonlinear phase shift of the system to below a value of 0.42 as compared to the modeled composite optical fiber span utilized to create FIG. 4. More specifically, FIG. 5 shows that at least 60 km of the first optical fiber was required to reduce the nonlinear phase shift of the system to less than 0.42. Further, FIG. 5 also shows that the optimum length of the first optical fiber in this embodiment is in the range from about 60 km to about 90 km which generally corresponds to a nonlinearity range from about 0.42 to about 0.40.

EXAMPLES

The invention will be further clarified by the following examples.

Example 1

Figure 11:
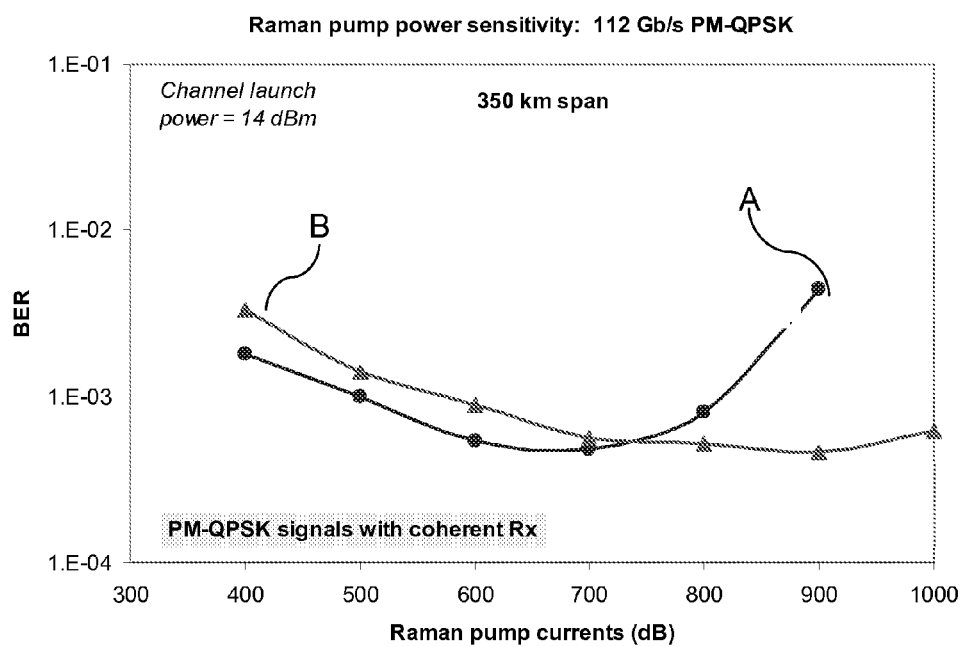
FIG. 11 graphically depicts the BER as a function of pump current for two different configurations of a composite optical fiber span.

A first long haul optical fiber transmission system with a composite optical fiber span as depicted in FIG. 2 was constructed from a first optical fiber with an effective area $Aeff_1$ of 135 $\mu m^2$ and a length $L_1$ of 24 km, a second optical fiber with an effective area $Aeff_2$ of 110 $\mu m^2$ and a length $L_2$ of 165 km, a third optical fiber with an effective area $Aeff_3$ of 78 $\mu m^2$ and a length $L_3$ of 161 km such that $L_1+L_2+L_3$ is 350 km. The composite optical fiber was used in conjunction with a 3-pump Raman Amplifier having pump wavelengths of 1427 nm, 1443 nm and 1462 nm. It was determined that pump currents of 700 mA maximized the optical signal to noise ratio of the system while minimizing the double Rayleigh backscattering in the composite optical fiber span. Curve A of FIG. 11 graphically depicts the bit error rate of the system with such a composite optical fiber span as a function of Raman pump current.

Example 2

A second long haul optical fiber transmission system with a composite optical fiber span 106 as depicted in FIG. 3 was constructed from a first optical fiber with an effective area $Aeff_1$ of 135 $\mu m^2$ and a length $L_1$ of 24 km, a second optical fiber with an effective area $Aeff_2$ of 110 $\mu m^2$ and a length $L_2$ of 155 km, a third optical fiber with an effective area $Aeff_3$ of 78 $\mu m^2$ and a length $L_3$ of 161 km such that $L_1+L_2+L_3$ is 340 km. The composite optical fiber span also included a fourth optical fiber with an effective area $Aeff_4$ of 110 $\mu m^2$ and a length $L_4$ of 10 km bringing the total length of the composite optical fiber span to 350 km. When used in conjunction with a 3-pump Raman Amplifier having pump wavelengths of 1427 nm, 1443 nm and 1462 nm, it was determined that pump currents of 900 mA maximized the optical signal to noise ratio of the system while minimizing the double Rayleigh backscattering in the composite optical fiber span. Curve B of FIG. 11 graphically depicts the bit error rate of the system with such a composite optical fiber span as a function of Raman pump current.

Example 3

Figure 6:
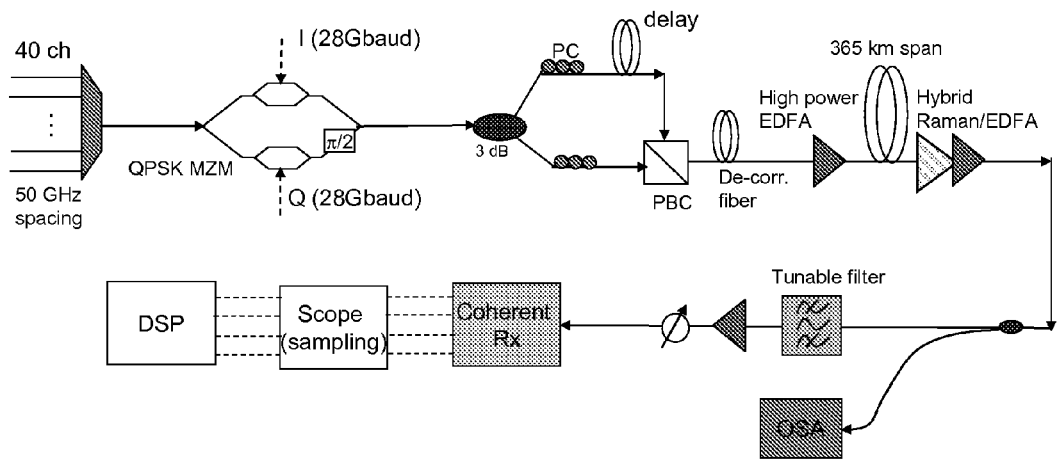
FIG. 6 schematically depicts an experimental set up for determining the efficacy of the long haul optical fiber transmission systems shown and described herein.

The experimental set-up depicted in FIG. 6 was utilized to assess the efficacy of a long haul optical fiber transmission system comprising a composite optical fiber span similar to that shown in FIG. 3. The experimental set-up comprised forty DFB lasers spaced by 50 GHz and ranging from 1542.9 nm to 1558.6 nm The lasers were multiplexed together and modulated by a QPSK modulator. The modulator was driven by two $2^{15}-1$ PRBS patterns at 28 Gb/s. The output from the QPSK modulator was then polarization multiplexed by splitting the signal, orthogonalizing the polarization states, de-correlating by hundreds of symbols with a relative delay, and combining with a polarization beam combiner to produce the final PM-QPSK signals modulated at 112 Gb/s. The 40 channels were launched into a 365 km composite optical fiber span after de-correlation by a short piece of standard single-mode fiber and amplification with a high-power EDFA with a nominally flat launch spectrum.

The composite optical fiber span comprised three different ultra-low loss silica core fibers with different effective areas. The first optical fiber in the composite optical fiber span was a 40 km length of a developmental fiber with an effective area of 128 $\mu m^2$ similar to the fibers disclosed in U.S. patent application Ser. No. 12/362,694 entitled "Large Effective Area Fiber With Ge-Free Core" filed Jan. 30, 2009 (now issued as U.S. Pat. No. 7,689,085). The second optical fiber in the composite optical fiber span was a 155 km length of Corning® Vascade® EX2000 fiber with an effective area of approximately 112 $\mu m^2$. The third optical fiber in the composite optical fiber span was a 160 km length of Corning® Vascade® EX1000 fiber with a 76 $\mu m^2$ effective area. The fourth optical fiber in the composite optical fiber span was a 10 km length of Corning® Vascade® EX2000 fiber with an effective area of approximately 112 $\mu m^2$. The first, second, third, and fourth optical fibers had attenuations of 0.162 dB/km, 0.162, dB/km, 0.164 dB/km and 0.162 dB/km, respectively. The length of the first optical fiber was selected to balance nonlinear tolerances at the end of the span. The total fiber span loss including splices was about 59.6 dB, giving an average fiber attenuation of 0.163 dB/km. The Raman gain primarily occurred in the third optical fiber length while the addition of the 10 km piece of fiber with an effective area of 112 $\mu m^2$ at the end of the span was predicted by modeling to maximize the overall system optical signal-to-noise ratio (OSNR) at the receiver while minimizing nonlinear penalties.

The Raman amplifier had three pump wavelengths at 1427 nm, 1443 nm, and 1462 nm. The total aggregate output power of the pumps was about 725 mW in each polarization at the optimal system power level which produced a total Raman gain of about 25 dB. Immediately following the Raman amplifier was an EDFA. A tunable optical filter with a 0.4 nm bandwidth was then used to select a channel for measurement.

The measurement channel was amplified before detection in a polarization- and phase-diverse digital coherent receiver that used a free-running local oscillator laser with nominal linewidth of 100 kHz. The four signals from the balanced photodetectors were digitized by analog-to-digital converters operating at 50 Gsamples/s using a real-time oscilloscope with 20 GHz electrical bandwidth. The sampled waveforms were processed off-line in a computer, with the digital signal processing steps including (i) quadrature imbalance compensation, (ii) up-sampling to 56 Gsamples/s and chromatic dispersion (~7000 ps/nm) compensation using a fixed time-domain equalizer (filter coefficients determined from the impulse response), (iii) digital square and filter clock recovery, (iv) polarization recovery, polarization mode dispersion compensation and residual dispersion compensation using an adaptive butterfly equalizer (filter coefficients determined using the constant modulus algorithm), (v) carrier frequency and phase recovery, and (vi) bit decisions. The bit error rate (BER) was determined for each of the 28 Gb/s tributary signals by direct error counting.

Figure 7:
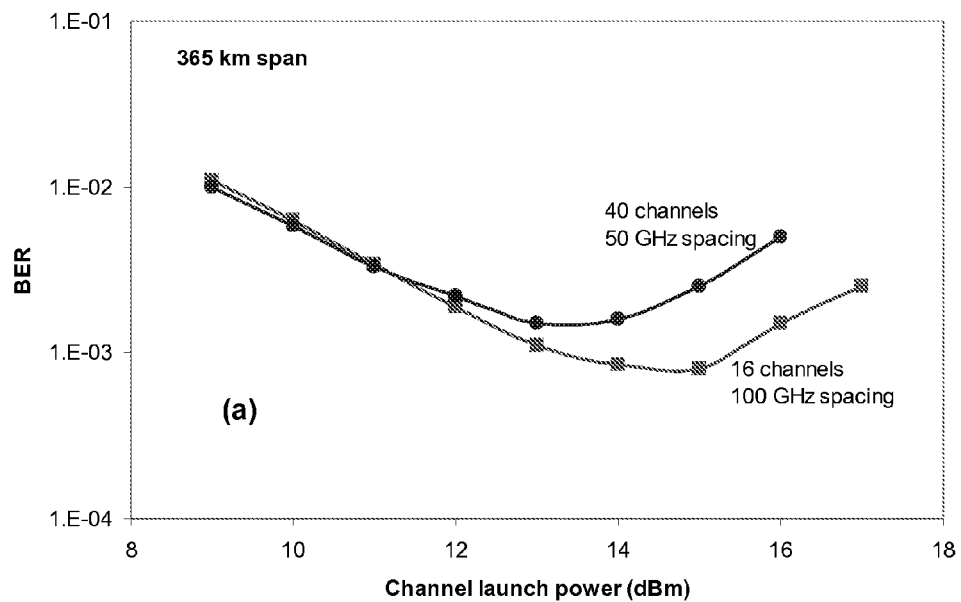
FIG. 7 graphically depicts the bit error rate (BER) as a function of the channel launch power for one embodiment of a long haul optical fiber transmission system.
Figure 8:
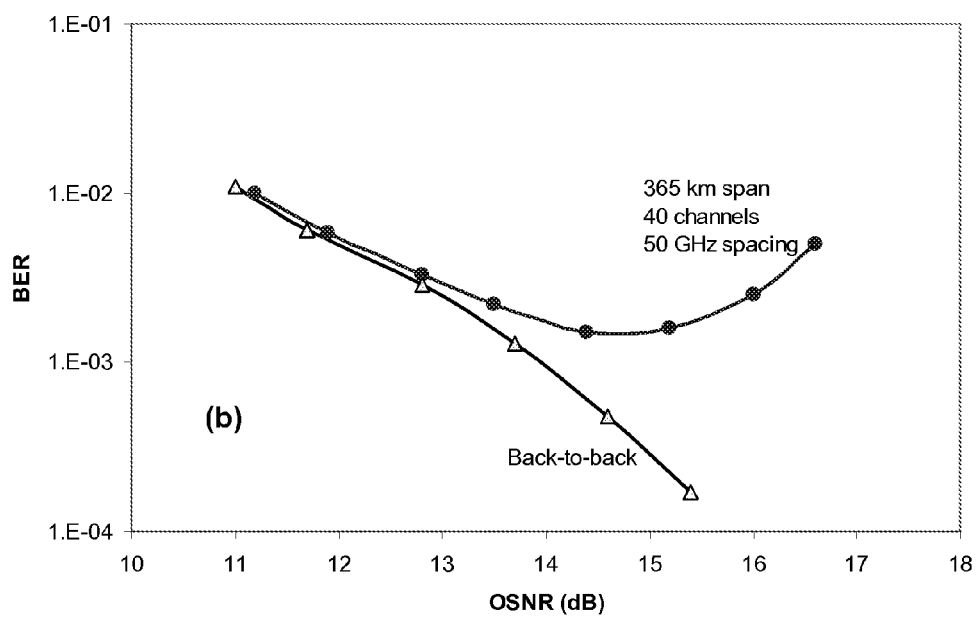
FIG. 8 graphically depicts the BER as a function of the optical signal to noise ratio (OSNR) for one embodiment of a long haul optical fiber transmission system.

The optimal channel launch power into the span was first determined. The BER was measured for a channel in the middle of the channel plan at 1550.92 nm as a function of launch power. The results from these measurements are shown in FIG. 7, which has the data for the 50 GHz, 40 channel system, and for sake of comparison, data for a 100 GHz, 16 channel system. The optimal channel launch power for the 40 channel system is seen to be between 13 and 14 dBm. In FIG. 8, the OSNR sensitivity of the measured channel using the DFB signal through the 365 km span is compared to the measured back-to-back OSNR sensitivity data with an external cavity signal laser.

Figure 9:
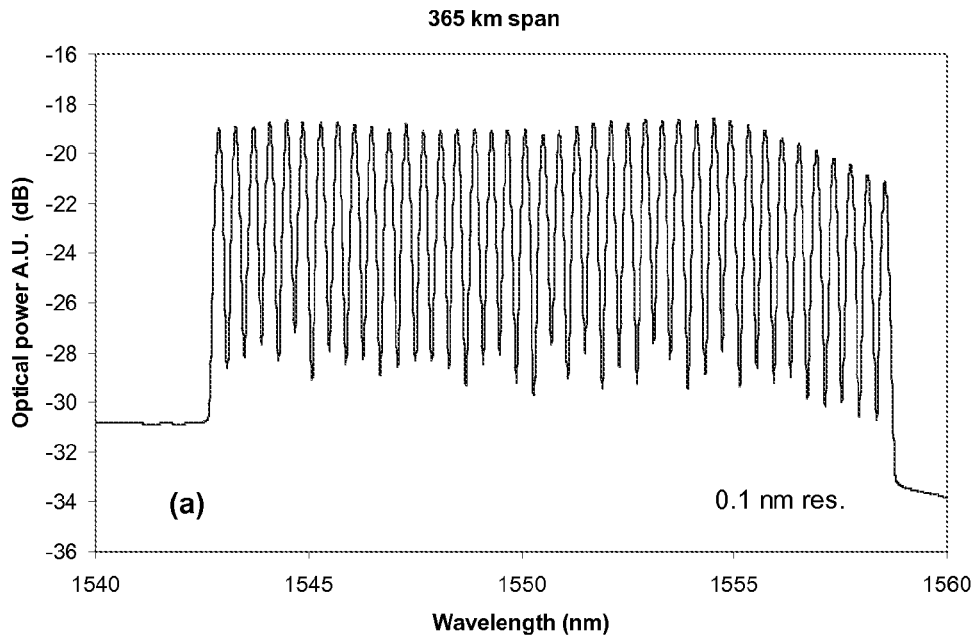
FIG. 9 graphically depicts the optical power of one embodiment of a long haul optical fiber transmission system as a function of wavelength.
Figure 10:
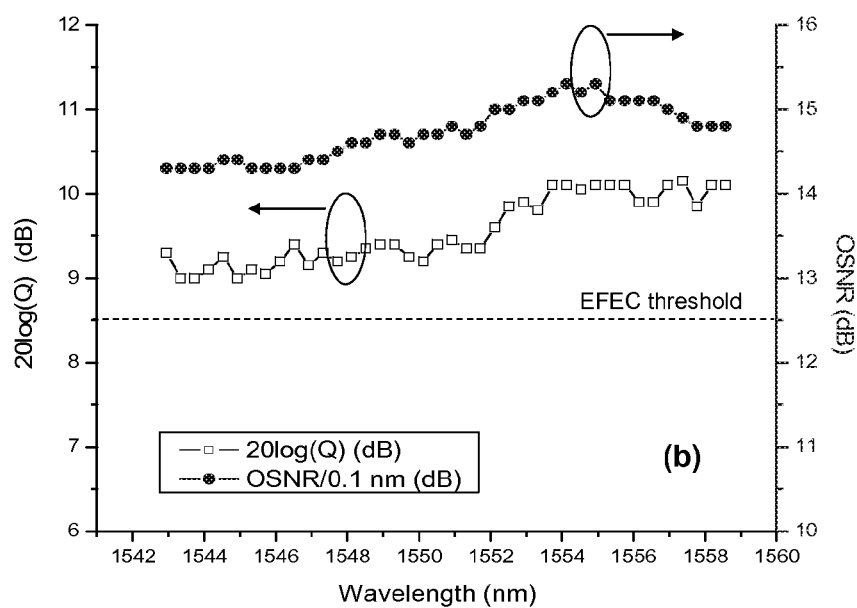
FIG. 10 graphically depicts the Q value and optical signal to noise ratio of one embodiment of a long haul optical fiber transmission system as a function of wavelength.

Based on the results shown in FIG. 7, the optimal launch power was set to be about 13.5 dBm per channel. The output spectrum at the end of the 365 km span is shown in FIG. 9. The range of received channel powers was less than 3 dB. The BER and OSNR values of all 40 channels were measured based on 1,000,000 samples for each of the four tributary signals. The calculated Q values based on the measured BER data and OSNR data are shown in FIG. 10. All 40 channels were determined to have Q values above the enhanced FEC (EFEC) threshold of 8.5 dB. The average Q value was 9.6 dB and the average OSNR value was 14.7 dB. The total bandwidth-distance product of the system was 40×100 Gb/s×365 km=1460 Tb/s-km.

The aforementioned example demonstrates that extremely high transmission rates may be obtained in an unrepeatered long haul optical fiber transmission system which incorporates an effective area managed, low attenuation composite optical fiber span having an initial length of optical fiber with a large effective area and a nonlinear phase shift of less than 0.46.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A long haul optical fiber transmission system comprising:
    a transmitter comprising a modulated bit rate of at least 40 Gb/s;
    a receiver optically coupled to the transmitter with a composite optical fiber span, the composite optical fiber span comprising:
    a first optical fiber optically coupled to the transmitter and comprising an effective area $Aeff_1$ of at least 120 $\mu m^2$, an attenuation $\alpha_1$ of less than 0.180 dB/km, a nonlinear refractive index $n_2^1$, and a length $L_1$ from about 60 km to about 90 km; and
    a second optical fiber optically coupled to the first optical fiber and comprising an effective area $Aeff_2$ of less than 120 $\mu m^2$, an attenuation $\alpha_2$ of less than 0.180 dB/km, a nonlinear refractive index $n_2^2$ and a length $L_2$, wherein a sum of the length $L_1$ and the length $L_2$ is at least 160 km, the composite optical fiber span does not comprise a repeater between the transmitter and the receiver, and the composite optical fiber span does not contain any rare earth dopants, , wherein a total length of the composite optical fiber span is 400 km or less.

2. The system of claim 1 wherein a nonlinear phase shift of the first optical fiber is 0.46 or less, where the nonlinear phase shift is defined as $$\frac{4.343 n_2^1}{Aeff_1 \alpha_1}[1-\exp(-\alpha_1 L_1/4.343)].$$

3. The system of claim 1 wherein $Aeff_1$ is greater than 130 $\mu m^2$.

4. The system of claim 1 wherein $Aeff_2$ is greater than 100 $\mu m^2$.

5. The system of claim 1 wherein a total length of the composite optical fiber span is 400 km or less, wherein the second optical fiber comprises an effective area of greater than 100 $\mu m^2$.

6. The system of claim 1 wherein the nonlinear refractive index $n_2^1$ of the first optical fiber is less than or equal to $2.2\times 10^{-20}$ $m^2/W$ and the nonlinear refractive index $n_2^2$ of the second optical fiber is less than or equal to $2.2\times 10^{-20}$ $m^2/W$.

7. The system of claim 1 wherein the transmitter comprises a Raman amplifier.

8. The system of claim 1 further comprising a third optical fiber having an effective area $Aeff_3$ of less than 120 $\mu m^2$, an attenuation of less than 0.180 dB/km, a length $L_3$ and a nonlinear refractive index $n_2^3$ less than or equal to $2.2\times 10^{-20}$ $m^2/W$, wherein the third optical fiber is optically coupled to the second optical fiber.

9. The system of claim 8 wherein the length $L_3$ of the third optical fiber is 240 km or less.

10. The system of claim 8 wherein the sum of the length $L_1$ of the first optical fiber, the length $L_2$ of the second optical fiber and the length $L_3$ of the third optical fiber is 300 km or greater.

11. The system of claim 8 wherein the effective area $Aeff_3$ of the third optical fiber is 100 $\mu m^2$ or less.

12. The system of claim 8 wherein the effective area $Aeff_3$ of the third optical fiber is less than the effective area $Aeff_2$ of the second optical fiber.

13. The system of claim 8 wherein the effective area $Aeff_3$ of the third optical fiber is greater than the effective area $Aeff_2$ of the second optical fiber.

14. The system of claim 8 further comprising a fourth optical fiber having an effective area $Aeff_4$ of less than 120 $\mu m^2$, an attenuation of less than 0.180 dB/km, a length $L_4$, and a nonlinear refractive index $n_2^4$ of less than or equal to $2.2\times 10^{-20}$ $m^2/W$, wherein the fourth optical fiber is optically coupled to the third optical fiber and the effective area $Aeff_4$ of the fourth optical fiber is greater than the effective area $Aeff_3$ of the third optical fiber.

15. The system of claim 14 wherein the effective area $Aeff_2$ of the second optical fiber is greater than the effective area $Aeff_3$ of the third optical fiber.

16. The system of claim 14 wherein the length $L_4$ of the fourth optical fiber is from about 10 km to about 20 km.

17. The system of claim 14 wherein the fourth optical fiber is optically coupled to the receiver and the receiver comprises a Raman amplifier.

18. The system of claim 14 wherein:
- the length $L_1$ of the first optical fiber is 40 km and the effective area $Aeff_1$ of the first optical fiber is 128 $\mu m^2$;
- the length $L_2$ of the second optical fiber is 155 km and the effective area $Aeff_2$ of the second optical fiber is 112 $\mu m^2$;
- the length $L_3$ of the third optical fiber is 160 km and the effective area $Aeff_3$ of the third optical fiber is 76 $\mu m^2$; and
- the length $L_4$ of the fourth optical fiber is 10 km and the effective area $Aeff_4$ of the forth optical fiber is 112 $\mu m^2$.

19. The system of claim 18 wherein a total bandwidth-distance product of the system is at least 1460 Tb/s-km.

* * * * *